US008127150B2

(12) United States Patent
Komarla et al.

(10) Patent No.: US 8,127,150 B2
(45) Date of Patent: Feb. 28, 2012

(54) DATA SECURITY

(75) Inventors: Eshwari P. Komarla, Bangalore (IN); Vincent J. Zimmer, Federal Way, WA (US); Mallik Bulusu, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 85 days.

(21) Appl. No.: 12/474,224

(22) Filed: May 28, 2009

(65) Prior Publication Data
US 2009/0254760 A1    Oct. 8, 2009

Related U.S. Application Data

(63) Continuation of application No. 10/686,410, filed on Oct. 14, 2003, now Pat. No. 7,562,230.

(51) Int. Cl.
| H04L 29/06 | (2006.01) |
| H04L 9/32 | (2006.01) |
| G06F 11/30 | (2006.01) |
| G06F 17/30 | (2006.01) |
| G06F 7/04 | (2006.01) |
| G06F 12/00 | (2006.01) |
| H04K 1/00 | (2006.01) |
| H04K 1/04 | (2006.01) |

(52) U.S. Cl. ........ 713/193; 713/162; 713/165; 713/168; 713/190; 726/2; 726/3; 380/28; 380/37; 380/281; 380/283; 380/284; 711/1; 711/114; 711/153

(58) Field of Classification Search .................. 713/193, 713/162, 165, 168, 190; 726/2, 3; 380/28, 380/37, 281–284; 711/1, 114, 153
See application file for complete search history.

(56) References Cited

U.S. PATENT DOCUMENTS

| 5,373,512 A | 12/1994 | Brady |
| 5,485,598 A | 1/1996 | Kashima et al. |
| 5,522,032 A | 5/1996 | Franaszek et al. |
| 5,640,506 A | 6/1997 | Duffy |

(Continued)

FOREIGN PATENT DOCUMENTS

DE    3613827 A1    10/1987

(Continued)

OTHER PUBLICATIONS

International Preliminary Report on Patentability for Patent Application No. PCT/US2004/033068, mailed Apr. 27, 2006, 7 pages.

(Continued)

*Primary Examiner* — Mohammad Reza
(74) *Attorney, Agent, or Firm* — Caroline M. Fleming

(57) ABSTRACT

In one embodiment, a method is provided that may include encrypting, based least in part upon at least one key, one or more respective portions of input data to generate one or more respective portions of output data to be stored in one or more locations in storage. The method of this embodiment also may include generating, based at least in part upon the one or more respective portions of the output data, check data to be stored in the storage, and/or selecting the one or more locations in the storage so as to permit the one or more respective portions of the output data to be distributed among two or more storage devices comprised in the storage. Many modifications, variations, and alternatives are possible without departing from this embodiment.

20 Claims, 3 Drawing Sheets

U.S. PATENT DOCUMENTS

| | | | |
|---|---|---|---|
| 5,883,909 A | 3/1999 | DeKoning et al. | |
| 5,931,947 A | 8/1999 | Burns et al. | |
| 6,084,968 A | 7/2000 | Kennedy et al. | |
| 6,097,818 A | 8/2000 | Saito | |
| 6,134,631 A * | 10/2000 | Jennings, III | 711/117 |
| 6,134,660 A | 10/2000 | Boneh et al. | |
| 6,157,721 A | 12/2000 | Shear et al. | |
| 6,170,058 B1 | 1/2001 | Kausik | |
| 6,260,120 B1 | 7/2001 | Blumenau et al. | |
| 6,282,650 B1 | 8/2001 | Davis | |
| 6,336,187 B1 | 1/2002 | Kern et al. | |
| 6,446,237 B1 | 9/2002 | Menon | |
| 6,510,521 B1 | 1/2003 | Albrecht et al. | |
| 6,807,649 B1 | 10/2004 | Murthy | |
| 6,920,154 B1 | 7/2005 | Archler | |
| 7,086,087 B1 * | 8/2006 | Kaminaga et al. | 726/16 |
| 7,140,044 B2 | 11/2006 | Redlich et al. | |
| 7,203,842 B2 * | 4/2007 | Kean | 713/189 |
| 7,337,331 B2 * | 2/2008 | Yoshida | 713/193 |
| 7,562,230 B2 | 7/2009 | Komarla et al. | |
| 2002/0114453 A1 | 8/2002 | Bartholet et al. | |
| 2002/0174351 A1 | 11/2002 | Jeong et al. | |
| 2003/0070083 A1 | 4/2003 | Nessler | |
| 2003/0084290 A1 | 5/2003 | Murty et al. | |
| 2003/0105967 A1 * | 6/2003 | Nam | 713/189 |
| 2003/0167395 A1 | 9/2003 | Chang et al. | |
| 2003/0188153 A1 * | 10/2003 | Demoff et al. | 713/153 |
| 2005/0071651 A1 | 3/2005 | Aguilar et al. | |
| 2006/0224902 A1 | 10/2006 | Bolt | |
| 2006/0224903 A1 | 10/2006 | Ginter et al. | |
| 2007/0016805 A1 | 1/2007 | Klein | |
| 2007/0067647 A1 | 3/2007 | Klein | |
| 2007/0074047 A1 | 3/2007 | Metzger et al. | |
| 2007/0079145 A1 | 4/2007 | Saito | |
| 2007/0088961 A1 | 4/2007 | Asano et al. | |

FOREIGN PATENT DOCUMENTS

| | | |
|---|---|---|
| EP | 0 421 409 A2 | 4/1991 |
| EP | 0 905 693 A1 | 3/1999 |
| JP | 51-43247 | 6/1993 |
| JP | 08-44632 | 2/1996 |
| JP | 10-275115 | 10/1998 |
| JP | 10-326154 | 12/1998 |
| JP | 2000-228060 | 8/2000 |
| JP | 2002-189945 A | 7/2002 |
| JP | 2002-351747 | 12/2002 |
| WO | 02/054663 A2 | 7/2002 |
| WO | 2005/038641 A2 | 4/2005 |
| WO | 2005/038641 A3 | 1/2006 |

OTHER PUBLICATIONS

Office Action Received for European Patent Application No. 04794425.1, mailed on Aug. 16, 2007, 3 pages.

Office Action Received for Japanese Patent Application No. 2006-535557, mailed on Sep. 2, 2008, 5 pages of English Translation.

Office Action Received for Japanese Patent Application No. 2006-535557, mailed on Jan. 13, 2009, 2 pages of English Translation.

Office Action Received for Japanese Patent Application No. 2006-535557, mailed on Nov. 2, 2010, 2 pages of English Translation.

Smith, John, "Carnegie Mellon Data and Computer Security", May 1990, last updated Apr. 2001, pp. 1-23, Chapter 1, vol. 7, Carnegie Mellon University.

Patterson, D.A., et al., "A Case for Redundant Arrays of Inexpensive Disks (RAID)", Jun. 1, 1988, pp. 109-116, XP000996447.

PCT Search Report, PCT/US2004/033068, mailed Oct. 24, 2005.

Office Action received for Japanese Patent Application No. 2006-535557, mailed on May 24, 2011, 6 pages of English Translation only.

* cited by examiner

DATA SECURITY

This is a Continuation of U.S. application Ser. No. 10/686,410, filed Oct. 14, 2003, now pending.

FIELD

This disclosure relates to data security.

BACKGROUND

In one conventional data storage arrangement, a computer node includes host processor and a host bus adapter (HBA). The HBA is coupled to a redundant array of independent disks (RAID) that include a plurality of data storage devices. In accordance with conventional RAID techniques, in response to data storage and retrieval requests from the host processor, the HBA stores data in, and retrieves data from the RAID.

If an intruder physically accesses and removes data storage devices from the RAID, the intruder may be able to use conventional RAID techniques to reconstruct the data stored in the RAID. This may make the data stored in the RAID less secure than may be desirable.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
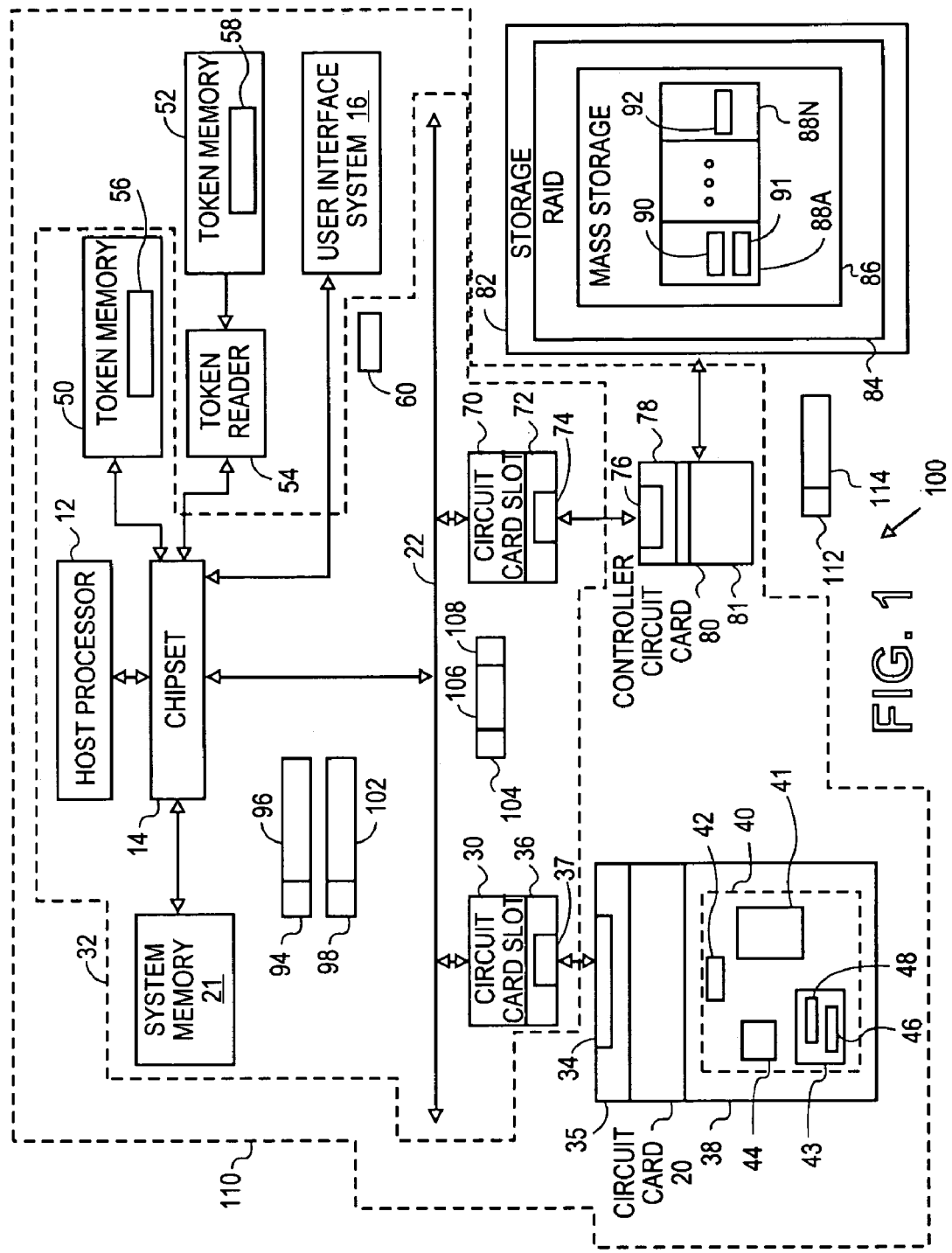
FIG. 1 is diagram that illustrates a system embodiment.

FIG. 1 illustrates a system embodiment 100. System 100 may operative circuitry 110 that may comprise, for example, a host processor 12 coupled to a chipset 14. Host processor 12 may comprise, for example, an Intel® Pentium® IV and/or Itanium® microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Operative circuitry 110 also may comprise, for example, token memory 50, token reader 54, user interface system 16, bus system 22, circuit card slot 30 and circuit card slot 70. Chipset 14 may comprise a bridge/hub system that may couple host processor. 12, system memory 21, and user interface system 16 to each other and to bus system 22. Chipset 14 may also include an input/output (I/O) bridge/hub system (not shown) that may couple the host bridge/bus system to bus 22. Chipset 14 may comprise one or more integrated circuit chips, such as those selected from integrated circuit chipsets commercially available from the assignee of the subject application (e.g., graphics memory and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Token memory 50 and token reader 54 each may be coupled to chipset 14. Token reader 54 may be capable of receiving, at least in part, removable token memory 52. For example, removable token memory 52 may be capable of being inserted, at least in part, into token reader 54, and after being so inserted into token reader 54, memory 52 may be removed token reader 54. When memory 52 is so inserted into token reader 54, memory 52 may become electrically coupled, at least in part, to token reader 54. Token memory 50 may store one or more tokens 56. Likewise, token memory 52 may comprise one or more tokens 58. As used herein, a "token" means one or more strings, symbols, and/or values.

Memory 50 and memory 52 each may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 50 and/or memory 52 may comprise other and/or later-developed types of computer-readable memory.

Bus 22 may comprise a bus that complies and/or is compatible with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies and/or is compatible with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

System embodiment 100 may comprise storage 82. Storage 82 may comprise RAID 84. RAID 84 may comprise mass storage 86 that may comprise a plurality of storage devices 88A ... 88N. Storage devices 88A ... 88N each may be or comprise one or more respective mass storage devices. As used herein, the terms "storage" and "storage device" may be used interchangeably to mean one or more apparatus into, and/or from which, data and/or commands may be stored and retrieved, respectively. Also, as used herein, the terms "mass storage" and "mass storage device" may be used interchangeably to mean one or more storage devices capable of non-volatile storage of data and/or commands, and, for example, may include, without limitation, one or more magnetic, optical, and/or semiconductor storage devices.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37 that may be electrically and mechanically mated with a mating bus connector 34 that may be comprised in a bus expansion slot or interface 35 in circuit card 20.

Also, depending upon, for example, whether bus 22 comprises a PCI Express™ bus or a PCI-X bus, circuit card slot 70 may comprise, for example, a PCI Express™ or PCI-X bus compatible or compliant expansion slot or interface 72. Interface 72 may comprise a bus connector 74 that may be electrically and mechanically mated with a mating bus connector 76 that may be comprised in a bus expansion slot or interface 78 in circuit card 80.

As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. In this embodiment, circuit card 20 may comprise operative circuitry 38. I/O controller circuit card 80 may comprise operative circuitry 81. Operative circuitry 38 may comprise, for example, computer-readable memory 43, computer-readable memory 44, I/O processor 41, and tamper detection circuitry 42. In this embodiment, card 20 may comprise a physical tampering detection boundary 40, and memory 43, memory 44, processor 41, and tamper detection circuitry 42 may be physically contained within boundary 40.

I/O processor 41 may comprise, for example, one or more Intel® IOP331 I/O processors, Intel® IOP321 I/O processors, Intel® 80200 processors, Intel® 80314 companion chips, Intel® 80312 I/O companion chips, Intel® 80303 I/O processors, and/or Intel® i960 RM/RN/RS I/O processors that are commercially available from the Assignee of the subject application. Of course, alternatively and/or additionally, processor 41 may comprise one or more other types of processors and/or integrated circuits, such as, for example, one or more processors and/or integrated circuits manufactured and/or commercially available from one or more sources other than the Assignee of the subject application, without departing from this embodiment.

Memory 21, memory 43 and/or memory 44 each may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 21, memory 43, and/or memory 44 may comprise other and/or later-developed types of computer-readable memory.

Machine-readable program instructions may be stored in memory 21 and/or memory 44. These instructions may be accessed and executed by operative circuitry 38, processor 12, circuitry 81, and/or other and/or additional circuitry comprised in operative circuitry 110. When so executed, these instructions may result in card 20, circuitry 38, card 80, circuitry 81, processor 12, and/or other and/or additional circuitry comprised in circuitry 110 performing the operations described herein as being performed by card 20, circuitry 38, card 80, circuitry 81, processor 12, and/or other and/or additional circuitry comprised in circuitry 110.

Slot 30 and card 20 may be constructed so as to permit card 20 to be inserted into slot 30. When card 20 is properly inserted into slot 30, connectors 34 and 37 may become electrically and mechanically coupled to each other. When connectors 34 and 37 are so coupled to each other, circuitry 38 may become electrically coupled to bus 22. Likewise, slot 70 and card 80 may be constructed to permit card 80 to be inserted into slot 70. When card 80 is properly inserted into slot 70, connectors 74 and 76 may become electrically and mechanically coupled to each other. When connectors 74 and 76 are so coupled to each other, circuitry 81 may become electrically coupled to bus 22. When circuitry 38 and circuitry 81 are electrically coupled to bus 22, circuitry 38 and circuitry 81 may change data and/or commands with each other, and with, for example, system memory 21, host processor 12, token memory 50, token reader 54, user interface system 16, and/or card via bus 22 and chipset 14.

Alternatively, without departing from this embodiment, some or all of operative circuitry 38 and/or operative circuitry 81 may not be comprised in card 20 and card 80, respectively, but instead, may be comprised in one or more other structures, systems, and/or devices. These other structures, systems, and/or devices may be, for example, comprised in motherboard 32, coupled to bus 22, and exchange data and/or commands with other components (such as, for example, system memory 21, host processor 12, token reader 54, token memory 50, storage 82, and/or user interface system 16) in system 100. For example, without departing from this embodiment, some or all of circuitry 38 and/or circuitry 81 may be comprised in one or more integrated circuits comprised in chipset 14.

Also alternatively, some or all of circuitry 81 may be comprised in circuitry 38. If all of circuitry 81 is comprised in circuitry 38, card 80 may be eliminated, and circuitry 38 may be coupled to storage 82.

Processor 12, system memory 21, chipset 14, bus 22, circuit card slots 30 and 70, and token memory 50 may be comprised in a single circuit board, such as, for example, a system motherboard 32. The number of storage devices 88A . . . 88N may vary without departing from this embodiment. Also without departing from this embodiment, token memory 50, and/or token reader 54 and token memory 52 may not be comprised in circuitry 110.

The RAID level that may be implemented by RAID 84 may be 0, 1, or greater than 1. Depending upon, for example, the RAID level implemented in RAID 84, the number of storage devices 88A . . . 88N that may be comprised in RAID 84 may vary so as to permit the number of storage devices 88A . . . 88N to be at least sufficient to implement the RAID level implemented in RAID 84. Although all of the storage devices 88A . . . 88N are shown in FIG. 1 as being comprised in RAID 84, without departing from this embodiment, one or more subsets of storage devices 88A . . . 88N may not be comprised in RAID 84.

Depending upon the particular configuration and operational characteristics of the circuitry 81 and storage 82, circuitry 81 and storage 82 may exchange data and/or commands in accordance with one or more of a variety of different communication protocols, e.g., a Small Computer Systems Interface (SCSI), Fibre Channel (FC), Ethernet, Serial Advanced Technology Attachment (S-ATA), and/or Transmission Control Protocol/Internet Protocol (TCP/IP) communication protocol. Of course, alternatively and/or additionally, circuitry 81 and storage 82 may exchange data and/or commands in accordance with other communication protocols, without departing from this embodiment.

In accordance with this embodiment, the SCSI protocol in accordance with which circuitry 81 and storage 82 may exchange data and/or commands may comply or be compatible with the protocol described in American National Standards Institute (ANSI) Small Computer Systems Interface-2 (SCSI-2) ANSI X3.131-1994 Specification. If circuitry 81 and storage 82 exchange data and/or commands in accordance with an FC protocol, the FC protocol may comply or be compatible with the protocol described in ANSI Standard Fibre Channel (FC) Physical and Signaling Interface-3 X3.303:1998 Specification. If circuitry 81 and storage 82 exchange data and/or commands in accordance with an Ethernet protocol, the Ethernet protocol may comply or be compatible with the protocol described in Institute of Electrical and Electronics Engineers, Inc. (IEEE) Std 802.3, 2000 Edition, published on Oct. 20, 2000. IF circuitry 81 and storage 82 exchange data and/or commands in accordance with S-ATA protocol, the S-ATA protocol may comply or be compatible with the protocol described in "Serial ATA: High Speed Serialized AT Attachment," Revision 1.0, published on Aug. 29, 2001 by the Serial ATA Working Group. Also, if circuitry 81 and storage 82 exchange data and/or commands in accordance with TCP/IP, the TCP/IP may comply or be compatible with the protocols described in Internet Engineering Task Force (IETF) Request For Comments (RFC) 791 and 793, published September 1981.

Circuitry 81 may be electrically coupled to storage 82. Circuitry 81 may be capable of exchanging data and/or commands with storage 82 that may result in circuitry 81 controlling and monitoring operation, at least in part, of storage 82.

Figure 2:
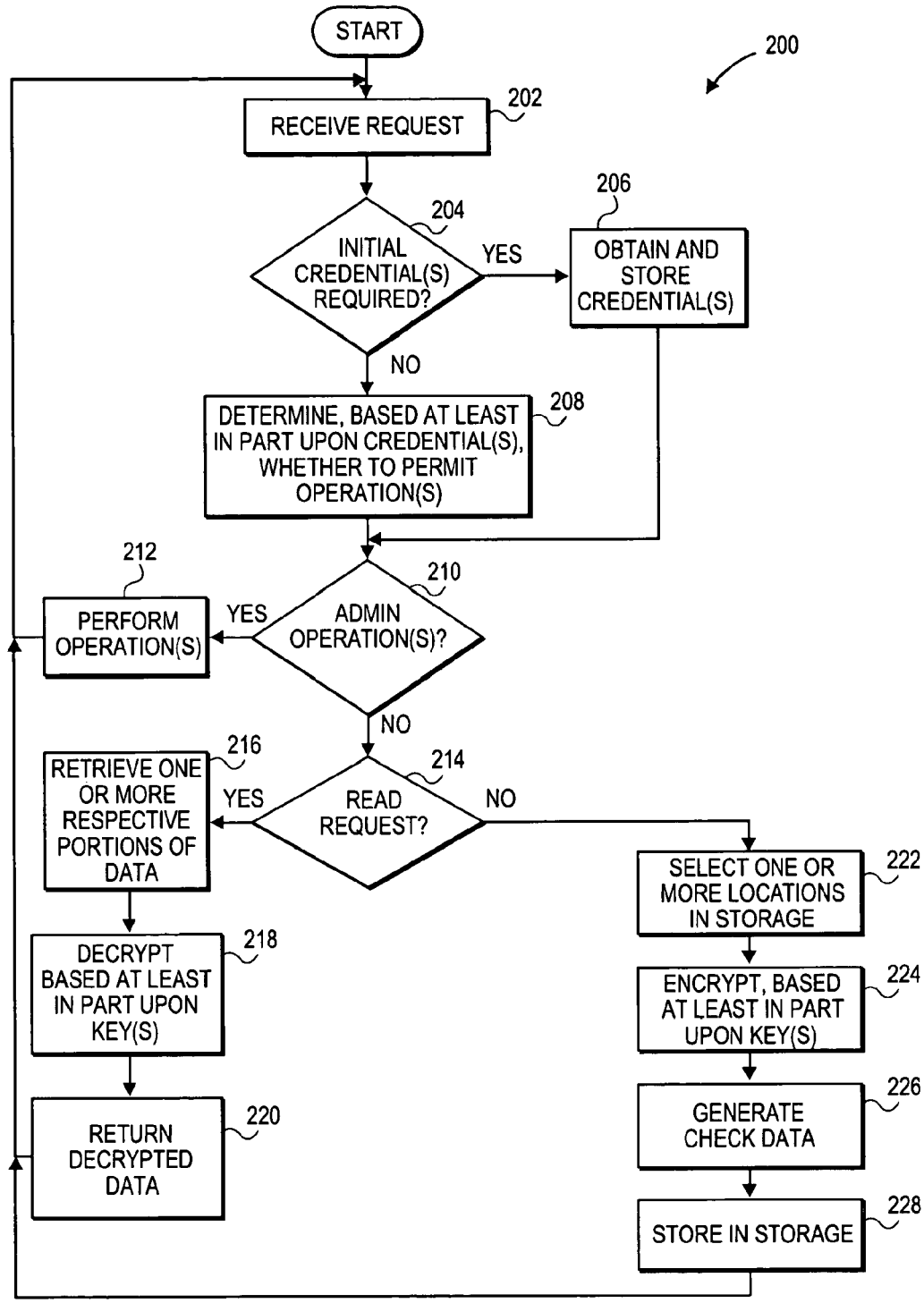
FIGS. 2 and 3 are flowcharts that illustrate operations that may be performed according to an embodiment.

With reference now being made to FIG. 2, operations 200 that may be carried out in system 100 according to an embodiment will be described. After, for example, a reset of system 100, card 20, and/or circuitry 110, a human user (not shown) may generate and issue, using user interface system 16, a request 60 to circuitry 38 requesting that storage 82 perform one or more requested operations. Circuitry 38 may receive request 60, as illustrated by operation 202 in FIG. 2.

In response, at least in part, to receipt by circuitry 38 of request 60, I/O processor 41 may determine whether one or more initial credentials are required, as illustrated by operation 204 in FIG. 2. As used herein, a "credential" means one or more strings, symbols, and/or values based, at least in part, upon which a decision may be made, at least in part, as to whether to permit an operation to be performed, such as, for example, in this embodiment, one or more tokens and/or user-supplied passwords. For example, as part of operation 204, in this embodiment, processor 41 may examine the contents of memory 43 to determine whether one or more credentials 46, one or more keys 48, and/or one or more partition and/or address mapping tables (not shown) for use in accessing storage 82 are stored therein. As used herein, a "key" means one or more strings, symbols, and/or values based, at least in part, upon which data may be encrypted and/or decrypted, at least in part. If processor 41 determines that no such credentials 46, keys 48, and/or partition and/or address mapping tables are stored in memory 43, processor 41 may determine, as a result of operation 204, that one or more initial credentials are required. For example, in this embodiment, the absence of such credentials 46, keys 48, and/or partition and/or address mapping tables from memory 43 may indicate that storage 82 has yet to be initially configured to permit data storage and retrieve from storage 82, and/or a system administrator has yet to be assigned. In this instance, the one or more requested operations are likely to comprise one or more administrative operations, such as, for example, operations that may result in an initial configuring of storage 82 to permit data to be stored in and retrieved from storage 82, and also may result in generation and storing in storage 82 of metadata comprising, for example, partition, address mapping table, and/or related information describing and/or embodying this configuring of storage 82. This initial configuring of storage 82 may comprise, for example, initializing data stripe, block, partition, address, and/or other and/or additional RAID configuration parameters in storage 82 and/or RAID 84.

If, as a result of operation 204, processor 41 determines that one or more initial credentials are required, processor 41 may obtain and store in memory one or more initial credentials, as illustrated by operation 206 in FIG. 2. For example, in this embodiment, as part of operation 206, processor 41 may signal user interface system 16. This may result in user interface system 16 prompting the human user to supply one or more passwords and/or one or more tokens 58, and by signaling token memory 50. The human user may supply and issue one or more passwords to processor 41 via user interface system 16, and/or may insert token memory 52 into token reader 54. As used herein, a "password" may, but is not required to comprise, a key (e.g., a public or private key) of a human user. The token reader 54 may read one or more tokens 58 and may supply one or more tokens 58 to processor 41. The signaling of token memory 50 by processor 41 may result in one or more tokens 56 being supplied from memory 52 to processor 41.

After, and in response, at least in part, to receipt of one or more tokens 50, one or more tokens 58, and one or more passwords supplied by the human user, processor 41 may store in memory 43, as one or more credentials 46, one or more tokens 50, one or more tokens 58, and/or these one or more passwords. Processor 41 also may generate one or more keys 48, based at least in part upon one or more tokens 50, one or more tokens 58, and/or the one or more passwords, and may store one or more keys 48 in memory 43. For example, processor 41 may calculate, using one or more predetermined hashing algorithms, one or more one-way hashes of some or all of one or more credentials 46, and may store the one or more hashes in memory 43 as one or more keys 48. An example of a hashing algorithm that may be used, in accordance with this embodiment, to calculate one or more keys 48 is Secure Hash Algorithm disclosed in Secure Hash Standard, Federal Information Processing Standard Publication (FIPS) 180-1, April 1995. Of course, other and/or additional hashing algorithms may be used to calculate one or more keys 48 without departing from this embodiment. As stated previously, memory 43 may comprise non-volatile memory. One or more credentials 46 and one or more keys 48 may be stored in this non-volatile memory in memory 43.

Conversely, if processor 41 determines as a result of operation 204 that one or more initial credentials are not required, processor 41 may determine, based at least in part upon one or more credentials 46 stored in memory 43 whether to permit the one or more operations requested by request 60 to be performed by storage 82, as illustrated by operation 208 in FIG. 2. For example, in this embodiment, as part of operation 208, processor 41 may signal user interface system 16 and memory 50. This may result in system 16 prompting the human user to provide one or more credentials to authorize performance of the one or more operations requested by request 60, and in memory 50 providing one or more tokens 56 to processor 41. The user may then insert one or more token memories (e.g., token memory 52) into token reader 54, and/or input one or more passwords via system 16 to supply, as one or more of the requested credentials, one or more tokens and/or one or more passwords to processor 41. Processor 41 may receive these one or more tokens and/or passwords, and may calculate, using a predetermined hashing algorithm, a one-way hash of some or all of one or more credentials 46 stored in memory 43, and may compare this one-way hash to another one-way hash, calculated by processor 41 using the predetermined hashing algorithm, of the received one or more tokens and/or passwords. If the two hashes match, processor 41 may determine, as a result of operation 208, that the performance by storage 82 of the one or more operations requested by request 60 is authorized, and may determine to permit the performance by storage 82 of these one or more operations. Conversely, if the two hashes do not match, processor 41 may determine, as a result of operation 208, that the performance of these one or more operations is not authorized, and may determine not to permit the performance by storage 82 of these one or more operations.

Alternatively or additionally, as part of operation 208, processor 41 may determine whether some or all of one or more credentials 46 match one or more corresponding credentials supplied to processor 41 from memory 50, reader 54, and/or system 16. If such a match exists, processor 41 may determine, as a result of operation 208, that the performance by storage 82 of one or more operations requested by request 60 is authorized, and may determine to permit the performance by storage 82 of the one or more operations requested by request 60. Conversely, if such a match does not exist, processor 41 may determine, as a result of operation 208, that these one or more operations are not authorized, and may determine not to permit the performance by storage 82 of these one or more operations. If processor 41 determines not to permit the performance by storage 82 of these one or more operations, processor 41 may signal system 16. This may result in system 16 indicating to the human user that the performance of these one or more operations is not authorized.

After either execution of operation 206, or a determination by processor 41, as a result of operation 208, to permit the performance of the one or more operations requested by request 60, processor 41 may determine whether these one or more operations are one or more administrative operations, as illustrated by operation 210, in FIG. 2. If processor 41 determines, as a result of operation 210, that these one or more operations are one or more administrative operations, processor 41 may generate and store in memory 43 metadata that may correspond and/or embody the configuration of storage 82 that is to result from the performance by storage 82 of these one or more administrative operations. Processor 41 also may encrypt this metadata, and may transmit one or more packets 94 to circuitry 81 that may comprise the encrypted metadata 96, and/or may signal circuitry 81.

In this embodiment, encrypted metadata 96 may be generated by processor 41 in accordance, at least in part, with one or more predetermined conventional symmetric encryption algorithms, using as operands the unencrypted metadata and one or more keys 48. In this embodiment, one or more keys 48 and these one or more symmetric encryption algorithms may comply and/or be compatible with, for example, Data Encryption Standard (DES), FIPS 46, dated January 1977, Advanced Encryption Standard (AES), FIPS 197, November 2001, and/or other and/or additional encryption algorithms. Also, additionally, without departing from this embodiment, depending upon the one or more communication protocols in accordance with which circuitry 81 and storage 82 may exchange data and/or commands, one or more packets exchanged between storage 82 and circuitry 81 may be encrypted in accordance, at least in part, with one or more predetermined symmetric encryption algorithms compatible and/or in compliance with, for example, "Security Architecture for the Internet Protocol," RFC 2401, IETF, 1998, Satran et al., "iSCSI," draft-ietf-ips-iscsi-20, Internet Draft, IETF, IP Storage Working Group, Jan. 19, 2003, one or more security protocols compatible and/or in compliance with FC protocol, and/or other and/or additional encryption protocols. As used herein, a "packet" means a sequence of one or more symbols and/or values that may be transmitted from at least one sender to at least one receiver. Circuitry 81 and storage 82 each may be capable of encrypting one or more packets prior to transmitting them from circuitry 81 and storage 82, respectively, and also may be capable of decrypting one or more packets after receiving them, in accordance with such one or more such encryption protocols.

In response, at least in part, to receipt of one or more packets 94 and/or the signaling by processor 41, circuitry 81 may signal storage 82, and/or may transmit to storage 82 one or more packets that may comprise encrypted metadata 96. This may result in storage 82 performing the one or more requested administrative operations, as illustrated by operation 212 in FIG. 2. For example, storage 82 may become configured in accordance with and/or as embodied by encrypted metadata 96, and also may store in one or more locations 91 of mass storage 86 one or more portions of encrypted metadata 96. Thus, in this embodiment, metadata may be stored in storage 82 in an encrypted state. Advantageously, this may make the metadata stored in storage 82 unintelligible to an intruder who may physically access and/or remove one or more mass storage devices in storage 82, and may prevent such intruder from determining the configuration of RAID 84. After operation 212 has been executed, system 100 may await the generation and issuance of another request (e.g., for storage 82 to perform one or more additional and/or other operations).

Conversely, if as a result of operation 210, processor 41 determines that the one or more requested operations requested by request 60 are not one or more administrative operations, processor 41 may determine whether the one or more requested operations comprise a request to read data from storage 82, as illustrated by operation 214 in FIG. 2. If as result of operation 214, processor 41 determines that the one or more requested operations comprise such a read request, processor 41 may examine request 60 to determine therefrom one or more locations in storage 82 that may be specified and/or indicated in request 60 from which to read data. For example, request 60 may specify and/or indicate one or more logical block addresses, stripes, and/or addresses in storage 82 from which to read data. Based at least in part upon these one or more locations specified and/or indicated in request 60 and the metadata stored in memory 43, processor 41 may translate the one or more locations specified and/or indicated in request 60 into one or more corresponding physical and/or logical locations (e.g., one or more locations 90 in one or more storage devices 88A) that actually may be addressed in storage 82. Processor 41 may generate and transmit to circuitry 81 one or more requests to read and retrieve from one or more locations 90 one or more portions of encrypted data stored in storage 82 that may correspond to one or more respective portions of the data requested by request 60 to be read.

In response, at least in part to receipt of these one or more requests from processor 41, circuitry 81 may transmit to storage 82 one or more packets that may request that storage 82 read and retrieve these one or more portions of encrypted data from one or more locations 90. This may result in storage 82 reading and retrieving this encrypted data from one or more locations 90, as illustrated by operation 216 in FIG. 2. Storage 82 may transmit to circuitry 81 one or more packets 112 that may comprise the requested one or more portions of encrypted data 114. Circuitry 81 may transmit this encrypted data 114 to processor 41.

In this embodiment, after receiving one or more portions of encrypted data 114, processor 41 may decrypt each respective portion of encrypted data 114, based at least in part upon one or more keys 48 and the one or more encryption algorithms in accordance with which encrypted data 114 may have been previously encrypted by processor 41, as illustrated by operation 218 in FIG. 2. Thereafter, processor 41 may return the thus generated one or more portions of decrypted data to the user in satisfaction of request 60, as illustrated by operation 220. For example, processor 41 may generate and transmit to user interface system 16 and/or system memory 21, via chipset 14, one or more packets 98 that may comprise these one or more portions of decrypted data 102. After operation 212 has been executed, system 100 may await the generation and issuance of another request (e.g., for storage 82 to perform one or more additional and/or other operations).

Conversely, if as a result of operation 214, processor 41 determines that the one or more operations requested by request 60 do not comprise a read request, processor 41 may determine that request 60 comprises a request to write data into storage 82. Processor 41 then may examine request 60 to determine therefrom one or more locations in storage 82 that may be specified and/or indicated in request 60 to which to write data specified in request 60. For example, request 60 may specify and/or indicate one or more logical block addresses, stripes, and/or addresses in storage 82 to which to write such data. Based at least in part upon these one or more locations specified and/or indicated in request 60, the metadata stored in memory 43, and conventional RAID techniques, processor 41 may select one or more locations in storage 82 into which to write one or more respective portions of encrypted data that may correspond to one or more respective portions of the data requested by request 60 to be written into storage 82, as illustrated by operation 222 in FIG. 2. For example, in this embodiment, as part of operation 222, processor 41 may translate the one or more locations specified and/or indicated in request 60 into one or more corresponding physical and/or logical locations (e.g., one or more locations 90 in one or more storage devices 88A) that actually may be addressed in storage 82. Also as part of operation 222, processor 41 may decompose the data requested by request 60 to be written into storage 82 into one or more respective portions of such data to be written into one or more respective locations 90. For example, depending upon the particular RAID level implemented by RAID 84, one or more locations 90 may comprise a plurality of locations distributed-among two or more storage devices comprised in one or more storage devices 88A.

Processor 41 may encrypt each of the one or more portions of the data from request 60, based at least in part upon one or more keys 48 and the one or more predetermined encryption algorithms described previously, as illustrated by operation 224 in FIG. 2. Thereafter, processor 41 may generate check data, using conventional RAID techniques and based at least in part upon the one or more encrypted portions of the data from request 60. As used herein, "check data" means first data generated based at least in part upon second data and from which the second data may be regenerated at least in part. In this embodiment, depending upon the RAID level implemented by RAID 84, this check data may comprise RAID parity data. Depending upon the particular RAID level implemented in RAID 84, processor 41 may select one or more locations (e.g., one or more locations 92 in one or more storage devices 88N) into which to write one or more portions of the check data generated as a result of operation 226. Although in FIG. 1, one or more locations 90 and one or more locations 92 are shown as being in one or more storage devices 88A and one or more storage devices 88N, respectively, depending upon the RAID level implemented in RAID 84, one or more locations 90 may comprise a plurality of locations distributed and/or interleaved among some or all of storage devices 88A . . . 88N, and/or one or more locations 92 may comprise a plurality of locations distributed and/or interleaved among some or all of storage devices 88A . . . 88N. For example, if the RAID level implemented in RAID 84 is equal to zero, the check data may be absent from RAID 84, and locations 90 may be comprise, for example, addresses and/or block locations in one or more devices 88A of one or more stripes (not shown) corresponding to the one or more portions of encrypted data generated as a result of operation 224. If the RAID level implemented in RAID 84 is greater than one, the check data may comprise parity data, and locations 90 and 92 may comprise, for example, addresses and/or block locations in devices 88A . . . 88N of one or more stripes (not shown) of such check data and/or encrypted data. Alternatively, if the RAID level implemented in RAID 84 is equal to one (i.e., RAID 84 implements data mirroring), the check data may comprise a copy of such encrypted data and these locations may comprise, for example, addresses and/or block locations of such encrypted data and the redundant copy of the encrypted data in respective mirrored volumes (not shown) in RAID 84.

In this embodiment, after performing operation 226, processor 41 may generate and transmit to circuitry 81 one or more requests to write into one or more locations 90 the one or more portions of the encrypted data generated as a result of operation 224 and, depending upon the RAID level implemented in RAID 84, also to write into one or more locations 92 the one or more portions of the check data generated as a result of operation 226. In response, at least in part to receipt of these one or more requests from processor 41, circuitry 81 may generate transmit to storage 82 one or more packets 104 that may comprise these one or more portions of encrypted data 106 and, depending upon the RAID level implemented in RAID 84, these one or more portions of check data 108. One or more packets 104 may request that storage 82 write these one or more portions of encrypted data 106 into one or more locations 90, and depending upon the RAID level implemented in RAID 84, also may request that storage 82 write into one or more locations 92 these one or more portions of check data 108. As illustrated by operation 228 in FIG. 2, this may result in storage 82 storing in one or more locations 90 these one or more respective portions of encrypted data 106, and depending upon the RAID level implemented by RAID 84, also may result in storage 82 storing one or more locations 92 these one or more respective portions of check data 108. After operation 228 has been executed, system 100 may await the generation and issuance of another request (e.g., for storage 82 to perform one or more additional and/or other operations).

In this embodiment, data requested to be written in request 60 may be decomposed into one or more portions corresponding to one or more stripes to be written into the storage 82, and each of the one or more portions may be respectively encrypted. Advantageously, depending upon the amount of data being accessed in a read of data from storage 82, this may permit only a single mass storage device spindle to be accessed as a consequence of such a data read. This may increase the data access speed in system 100 compared to the data access speed that might occur if the data requested to be written in request 60 were to be encrypted as a whole, and the encrypted data, as a whole, were to be decomposed into one or more stripes to be written to storage 82, since this might increase the number of operations required to read and decrypt the data.

Although not shown in the Figures, system 100 may comprise a remote user interface system communicatively coupled to chipset 14 via a remote network link that may permit a remote human user to issue commands to and/or monitor operation of system 100. The operation of this remote user interface system may be substantially similar to the operation of system 16.

System 100 may be capable of performing a hot restore and/or rebuild operation. For example, in response to hot plug replacement of a failed storage device with a new storage device in RAID 84, storage 82 may signal circuitry 81. In response to this signaling by storage 82, circuitry 81 ma y signal processor 41. In this embodiment, depending upon the RAID level implemented in RAID 84, this may result in processor 41, in accordance with the above teachings of this embodiment, successively reading from RAID 84 each respective user data and check data stripe comprised each respective logical RAID block that comprised a respective user data or check data stripe in the failed storage device, decrypting each such read stripe, using conventional RAID techniques to reconstruct the unencrypted version of the respective user data or check data stripe in the failed storage device, encrypting the reconstructed stripe, and then requesting that circuitry 81 request that storage 81 write the encrypted reconstructed stripe into the new storage device. Processor 41 also may appropriately modify the metadata stored in memory 43 and the encrypted metadata stored in storage 82 to take into account the removal of the failed storage device and the writing of its reconstructed encrypted data and/or parity stripes in the new storage device.

Figure 3:
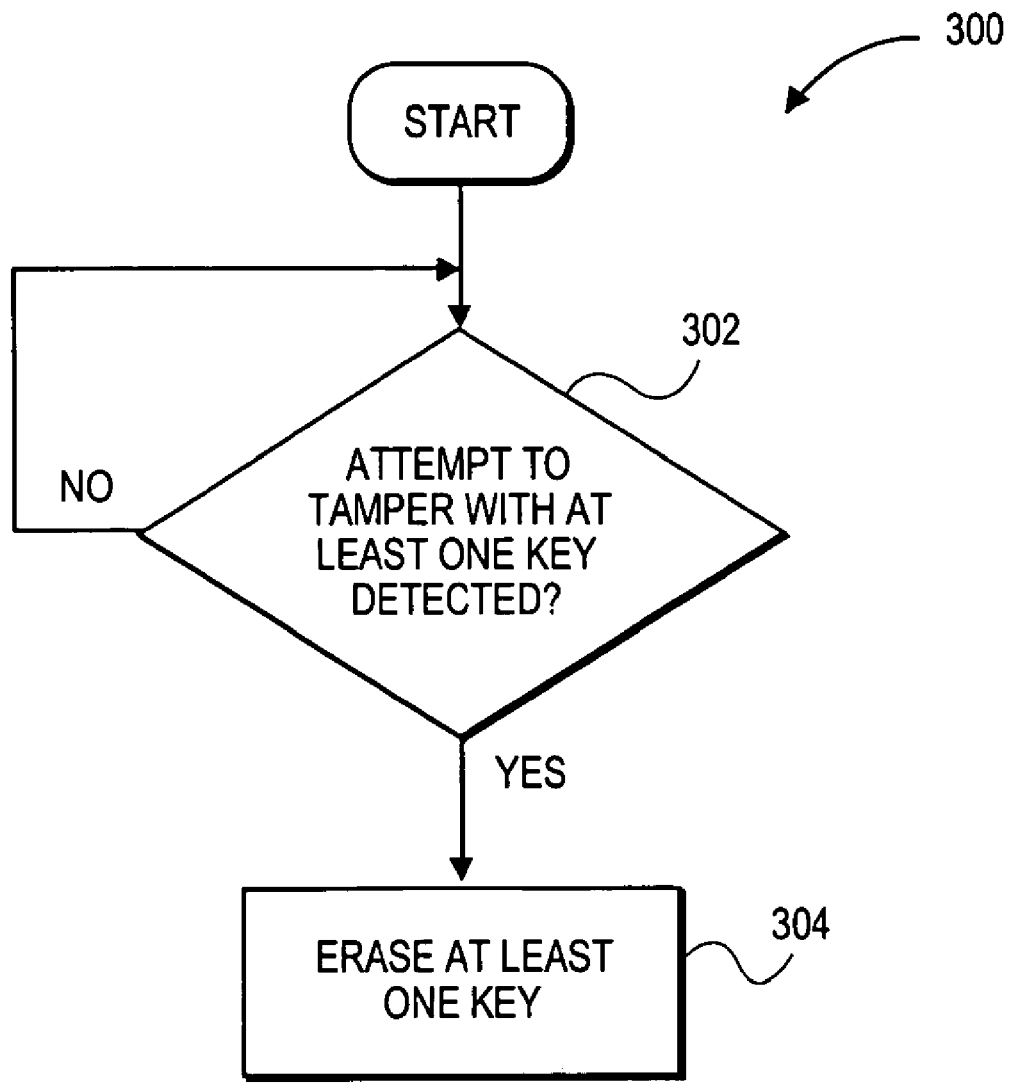

With reference now being made to FIG. 3, other and/or additional operations 300 that may be carried out in system 100 according to an embodiment will be described. After, for example, a reset of system 100, card 20, and/or circuitry 110, tamper detection circuitry 42 may detect whether an attempt to tamper with one or more keys 48 and/or one or more credentials 46 has occurred, as illustrated by operation 302 in FIG. 3. For example, as part of operation 302, using conventional techniques, circuitry 42 may be capable of detecting a physical breach of conventional physical tamper resistant boundary 40, such as, for example, by an intruder attempting to gain physical access to memory 43 for the purposes of unauthorizedly modifying contents of memory 43, such as, for example, one or more keys 48 and/or one or more credentials 46. Also as part of operation 302, in response at least in part to detection by circuitry 42 of the physical breaching of boundary 40, circuitry 42 may log the occurrence of the physical breach to non-volatile memory (not shown) comprised in circuitry 42. Additionally, as part of operation 302, upon a subsequent reset of system 100, card 20, and/or circuitry 110, tamper detection circuitry 42 may examine this non-volatile memory to determine whether such the occurrence of a physical breaching of boundary 40 has been logged, and if circuitry 42 determines that such a breach has occurred, circuitry 42 may signal memory 43. This may result in the erasing (e.g., the overwriting in memory 43 with one or more arbitrary values, such as, for example, a plurality of zeroes) of one or more keys 48 and/or one or more credentials 46, as illustrated by operation 304. Advantageously, this may make it essentially impossible for the intruder to decrypt the contents of storage 82, thereby eliminating the intruder's ability to reconstruct intelligibly the contents of storage 82. Conversely, if circuitry 42 determines that no occurrence of a breach of boundary 40 has been logged in this non-volatile memory, circuitry 42 may continue to monitor for such breach, without erasing the contents of memory 43.

As an alternative to the foregoing, instead of determining whether each request for the performance of operation by storage 82 is authorized, after each reset of system 100, card 20, and/or circuitry 110, processor 41 may determine whether the next such request is authorized. If processor 41 determines that such request is authorized, processor 41 may permit subsequent such requests to be performed by storage 82, until a subsequent resetting of system 100, card 20, and/or circuitry 110, without determining whether they are authorized.

Thus, one system embodiment may comprise a circuit board that comprises a circuit card slot and a circuit card that is capable of being inserted into the circuit card slot. The circuit card may comprise circuitry capable of encrypting, based least in part upon at least one key, one or more respective portions of input data to generate one or more respective portions of output data to be stored in one or more locations in storage. The circuitry may also be capable of generating, based at least in part upon the one or more respective portions of the output data, check data to be stored in the storage, and/or selecting the one or more locations so as to permit the one or more respective portions of the output data to be distributed among two or more storage devices comprised in the storage.

The circuitry in this embodiment also be capable of decrypting, based least in part upon at least one key, one or more respective portions of input data from storage to generate one or more respective portions of output data. The circuitry may also be capable of generating check data to be stored in the storage and/or retrieving the one or more respective portions of the input data from a plurality of storage devices comprised in the storage. The check data may be generated based at least in part upon the one or more respective portions of the input data.

Advantageously, these features of this embodiment may prevent an intruder from being able to reconstruct data stored in the storage of this embodiment, even if the intruder physically accesses and removes storage devices that may be comprised in the storage. Advantageously, this may make the data stored in the storage of this embodiment more secure than is possible according to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Additional modifications are also possible. Accordingly, the claims are intended to cover all such equivalents.

What is claimed is:

1. A method comprising:

storing configuration parameters for determining a configuration of a redundant array of independent disks (RAID) storage;

storing, in a non-volatile memory, a key used to enable encryption, the non-volatile memory in a circuit card not comprised in the RAID storage;

receiving a request to write data to one or more locations in the RAID storage;

encrypting, based upon at least one key, one or more respective portions of write data to generate one or more respective portions of encrypted write data to be stored in the one or more locations of the RAID storage;

generating, based upon the one or more respective portions of the encrypted write data, check data to be stored in the RAID storage;

selecting the one or more locations in the RAID storage for storing the one or more respective portions of the encrypted write data by translating the one or more locations specified in the request into one or more physical or logical locations in the RAID storage based at least upon the stored configuration parameters so as to permit the one or more respective portions of the encrypted write data to be distributed among the one or more storage locations comprised in the RAID storage; and storing each of the one or more portions of the encrypted write data and check data into the one or more corresponding locations of the RAID storage.

2. The method of claim 1, further comprising:
determining, based upon one or more credentials whether to perform one or more operations involving the RAID storage.

3. The method of claim 2, further comprising:
detecting attempts to tamper with one or more credentials.

4. The method of claim 1, wherein the check data comprises one of parity data and a copy of the encrypted write data.

5. The method of claim 1, wherein the stored configuration parameters for RAID storage configure the RAID storage as one of a plurality of RAID levels.

6. The method of claim 1, wherein the RAID level is selected from the group consisting of 0, 1 and 5.

7. The method of claim 1, wherein the circuit card is coupled to a PCI-Express card slot.

8. A method comprising: storing configuration parameters for determining a configuration of a redundant array of independent disks (RAID) storage;
storing, in a non-volatile memory, a key used to enable decryption, the non-volatile memory in a circuit card not comprised in the RAID storage;
receiving a request to retrieve requested data from one or more locations in the RAID storage;
translating the one or more locations specified in the request into one or more physical or logical locations in the RAID storage based at least upon the stored configuration parameters;
retrieving one or more respective portions of encrypted data and corresponding check data from the one or more translated locations in the RAID storage; and
decrypting the one or more respective portions of the encrypted read data retrieved from the one or more locations in the RAID storage based upon at least one key to generate one or more respective portions of read data.

9. The method of claim 8, further comprising:
determining, based upon one or more credentials whether to perform one or more operations involving the RAID storage.

10. The method of claim 8, further comprising:
detecting attempts to tamper with one or more credentials.

11. The method of claim 9, wherein the stored configuration parameters for RAID storage configure the RAID storage as one of a plurality of RAID levels.

12. An apparatus comprising:
a circuit card comprising:
a non-volatile memory to store configuration parameters for determining a configuration of a redundant array of independent disks (RAID) storage and the non-volatile memory to store a key used to enable encryption; and
logic to receive a request to write data to one or more locations in the RAID storage, to encrypt, based upon at least one key, one or more respective portions of write data to generate one or more respective portions of encrypted write data to be stored in the one or more locations of the RAID storage, to generating, based upon the one or more respective portions of the encrypted write data, check data to be stored in the RAID storage, to select the one or more locations in the RAID storage for storing the one or more respective portions of the encrypted write data by translating the one or more locations specified in the request into one or more physical or logical locations in the RAID storage based at least upon the stored configuration parameters so as to permit the one or more respective portions of the encrypted write data to be distributed among the one or more storage locations comprised in the RAID storage and to store each of the one or more portions of the encrypted write data and check data into the one or more corresponding locations of the RAID storage.

13. The apparatus of claim 12, wherein the logic to determine, based upon one or more credentials whether to perform one or more operations involving the RAID storage.

14. The apparatus of claim 13, wherein the logic to detect attempts to tamper with one or more credentials.

15. The apparatus of claim 12, wherein the check data comprises one of parity data and a copy of the encrypted write data.

16. The apparatus of claim 12, wherein the stored configuration parameters for RAID storage configure the RAID storage as one of a plurality of RAID levels.

17. The apparatus of claim 12, wherein the circuit card is coupled to a PCI-Express card slot.

18. A system comprising:
a circuit board comprising a circuit card slot and a circuit card that is capable of being inserted into the circuit card slot, the circuit card comprising:
a non-volatile memory to store configuration parameters for determining a configuration of a redundant array of independent disks (RAID) storage and a key used to enable encryption; and
circuitry to receive a request to write data to one or more locations in the RAID storage, to encrypt, based upon at least one key, one or more respective portions of write data to generate one or more respective portions of encrypted write data to be stored in the one or more locations of the RAID storage, to generating, based upon the one or more respective portions of the encrypted write data, check data to be stored in the RAID storage, to select the one or more locations in the RAID storage for storing the one or more respective portions of the encrypted write data by translating the one or more locations specified in the request into one or more physical or logical locations in the RAID storage based at least upon the stored configuration parameters so as to permit the one or more respective portions of the encrypted write data to be distributed among one or more storage locations comprised in the RAID storage and to store each of the one or more portions of the encrypted write data and check data into the one or more corresponding locations of the RAID storage.

19. The system of claim 18, wherein the logic to determine, based upon one or more credentials whether to perform one or more operations involving the RAID storage.

20. The system of claim 19, wherein the logic to detect attempts to tamper with one or more credentials.

* * * * *